US009044701B2

(12) United States Patent
Sumikura et al.

(10) Patent No.: US 9,044,701 B2
(45) Date of Patent: Jun. 2, 2015

(54) GAS PURIFICATION APPARATUS AND RELATED METHOD

(75) Inventors: Kosuke Sumikura, Tokyo (JP); Katsuji Ikeda, Tokyo (JP); Masaaki Iosaki, Nagareyama (JP); Yoshinori Takeuchi, Tama (JP)

(73) Assignees: Asahi Glass Company, Limited, Tokyo (JP); Kinotech Solar Energy Corporation, Tokyo (JP)

( * ) Notice: Subject to any disclaimer, the term of this patent is extended or adjusted under 35 U.S.C. 154(b) by 241 days.

(21) Appl. No.: 13/700,276

(22) PCT Filed: May 27, 2011

(86) PCT No.: PCT/JP2011/062220
§ 371 (c)(1),
(2), (4) Date: Apr. 1, 2013

(87) PCT Pub. No.: WO2011/149053
PCT Pub. Date: Dec. 1, 2011

(65) Prior Publication Data
US 2013/0186274 A1  Jul. 25, 2013

(30) Foreign Application Priority Data
May 28, 2010 (JP) .................. 2010-123105

(51) Int. Cl.
*B01D 50/00* (2006.01)
*C25C 7/00* (2006.01)
(52) U.S. Cl.
CPC .............. *B01D 50/00* (2013.01); *C25C 7/005* (2013.01)

(58) Field of Classification Search
CPC ........ B01D 50/00; C25C 7/005; C25B 1/245; C25B 15/08; C25B 15/02
USPC .................................................. 95/290, 288
See application file for complete search history.

(56) References Cited

U.S. PATENT DOCUMENTS

| 7,556,678 B2 | 7/2009 | Hayakawa et al. | |
| 2002/0005357 A1* | 1/2002 | Kondo et al. | ..................... 205/43 |
| 2005/0132882 A1* | 6/2005 | Hayakawa et al. | ............. 95/116 |
| 2013/0247998 A1* | 9/2013 | Ohkubo et al. | ................. 137/13 |

FOREIGN PATENT DOCUMENTS

| EP | 1 544 325 A3 | 9/2005 |
| JP | 11-071694 | 3/1999 |
| JP | 2005-179709 | 7/2005 |
| JP | 2005-200758 | 7/2005 |
| JP | 2006-111900 | 4/2006 |

OTHER PUBLICATIONS

Machine Translation for Okubo JP 2009-242944 A, Translated Sep. 17, 2014, All Pages.*

* cited by examiner

*Primary Examiner* — Amber Orlando
*Assistant Examiner* — Brittanny Precht
(74) *Attorney, Agent, or Firm* — Duane Morris LLP; Steven E. Koffs

(57) ABSTRACT

A gas purification apparatus, highly purifying gas containing salt derived from molten salt stored in a vessel (10), is provided with a reflux mechanism (35, 42) liquefying the salt, contained in the gas, for return to the molten salt in the vessel, and a filtration mechanism (39, 44) disposed in an exhaust flow path of the gas on a downstream stage of the reflux mechanism.

18 Claims, 4 Drawing Sheets

FIG. 3

TABLE

| | | UNIT | COND A | COND B | COND C | COND D | COND E | COND F | COND G | COND H | COND I |
|---|---|---|---|---|---|---|---|---|---|---|---|
| TEST COND | ZnCl2 TEMP | °C | 575~585 | | | | | | | | |
| | INNER DIA | mm | 108 | | | | | | | | |
| | Cl2 AMT | l/min | 10 | | | | | | | | |
| | FLOW RATE | cm/sec | 3.75 | | | | | | | | |
| | TEST TIME | h | 10 | | | | | | | | |
| | INFLUENT ZnCl2 WT | g/min | 3.9 | | | | | | | | |
| | PRI G TEMP | °C | 340~360 | | | | | | - | - | 340~360 |
| | SEC G TEMP | °C | 180~220 | | | | | | - | - | 120~130 |
| | MATL | - | CARBON | | | | ALUMINA | | - | ALUMINA | |
| | THICKNESS | mm | 200 | 200 | 700 | 25 | 200 | 300 | - | 300 | |
| | POROSITY | % | 71.5 | 68.2 | | | 91 | | - | 91 | |
| | SP SUR A | cm²/cm³ | 3.1 | 4.8 | | | 44 | | - | 44 | |
| | TOT SUR A | cm² | 5733 | 8735 | 30574 | 12072 | 80575 | 120862 | 0 | 120862 | |
| | TOT SUR A / INFLUENT ZnCl2 WT | cm²·min/g | 1470 | 2240 | 7839 | 2583 | 20660 | 30990 | - | - | 1549500 |
| TEST RESULT | COLLECTED ZnCl2 WT | g | 1379.9 | 1027.6 | 140.2 | 1843.1 | 347.0 | 10.6 | 2326 | 87 | 320 |
| | ZnCl2 TRANSMISSIVITY | % | 59.1 | 44.0 | 6.0 | 78.9 | 14.9 | 0.5 | 100 | 5.3 | 22.4 |
| | G PRESS D | kPa | <0.1 | <0.1 | <0.1~0.5 | <0.1 | <0.1~0.5 | 0.2~1.1 | - | <0.1 | <0.1 |

GAS PURIFICATION APPARATUS AND RELATED METHOD

TECHNICAL FIELD

The present invention relates to a gas purification apparatus and its related method and, more particularly, to a gas purification apparatus and its related method for highly purifying gas extracted from a vessel in which molten salt is stored under a molten state maintained at a temperature equal to or above a melting point.

BACKGROUND ART

In business equipment with a need to deal with molten salt under a high temperature condition equal to or above a melting point, generally, it is likely that there is a phenomenon in which vapor, mist and fine particles, generated from such molten salt, result in the clogging of a filter, contamination of product gas and the clogging of a delivery conduit. Thus, an exceedingly large number of matters need to be considered for equipment structures and processing steps.

In production of, for instance, titanium, a process has adopted a step of obtaining titanium on reduction of titanium tetrachloride with magnesium metal. In such a process, used magnesium is collected as magnesium chloride and magnesium metal can be obtained again by conducting electrolysis of resulting magnesium chloride as molten salt, thereby achieving recycle of magnesium metal.

In molten salt electrolysis of such magnesium chloride, magnesium chloride has a melting point of 714° C. while magnesium has a melting point of about 650° C. and, hence, magnesium can be extracted in molten metal provided that a temperature of molten salt is 650° C. or more. In order to perform electrolysis at a temperature equal to or above 650° C. but at a temperature as low as possible, alkaline metal has been added to magnesium chloride to be molten in an eutectic state under which electrolysis is conducted.

Reasons why molten salt electrolysis of magnesium chloride is performed at such a lower temperature is because of not only a need to achieve energy saving but also a need to minimize the occurrence of clogging of a gas extraction delivery conduit in the presence of vapor, mist and fume, contamination of the device, a loss of magnesium chloride or the like, caused when molten liquid of magnesium chloride is kept at a high temperature. In actual practice, however, it is a present situation that even if an attempt is made to incorporate such additive with a view to lowering the melting point for electrolysis, the occurrence of the clogging in a delivery conduit portion or the like cannot be reliably suppressed due to magnesium chloride.

In production of silicon, further, zinc metal is used in reduction of silicon tetrachloride and, hence, there is a need to electrolyze molten salt of zinc chloride generated as a by-product. In such a case, zinc has a melting point of 413° C. whereas zinc chloride has a melting point of about 280° C. In order for zinc to be extracted in a molten state, therefore, there is a need for electrolysis to be conducted at a temperature as high as 413° C. or more that is higher in temperature than the melting point of zinc chloride by 100° C. or more. That is, it is more difficult in a present situation to avoid the occurrence of clogging of the gas extraction delivery conduit due to vapor, mist and fine particles generated from molten salt.

Furthermore, such a phenomenon with the occurrence of clogging of the gas extraction delivery conduit due to vapor, mist and fine particles generated from such molten salt can be seen not only in production of titanium or silicon but also in overall process of dealing with molten salt at high temperatures. It can be said that such a phenomenon is one of important issues inherent to such a process in nature to be studied.

Under such circumstances, Patent Publication 1 proposes an electrolyte cell in which an air space is provided in an upper area of electrolytic liquid for storing resulting electrolytic product gas with a view to returning resulting vapor and mist to electrolytic liquid with only electrolytic gas being delivered through a gas extraction delivery conduit.

PRIOR ART TECHNICAL LITERATURE

Patent Literature

Patent Publication 1: Japanese Patent Application Laid-Open Publication No. 2005-200758

SUMMARY OF THE INVENTION

Problem to be Solved by the Invention

According to studies conducted by the present inventor, however, when an attempt is made to execute an operation with an apparatus formed in a larger size than that, disclosed in Patent Publication 1, for a long period of time, the amount of resulting electrolytic product gas increases. Thus, there is a need for the air space, provided in the upper area of the electrolytic liquid, to be set to a further increasing volume. This results in a tendency of suffering cumbersome troubles due to a further increase in size of a device structure or the like.

In general, further, although a demister, made of metal, resin or the like, is used in an aqueous solution system as a device for separating gas and mist for collection in the form of liquid droplets, no demister is present in a specification that can be applied to molten salt equipment at a high temperature. Furthermore, newly developing the demister, available to be used for a long time at such a high temperature, results in a need to begin developing materials excellent in heat resistance and corrosion resistance and it can be said not to be realistic.

That is, a current situation is that a gas purification apparatus and its related method are required in a realistic structure which can reliably remove a salt constituent in vapor, mist and fine particles in a mixed state accompanied with gas, when extracting gas from a vessel storing molten salt held at a temperature equal to above a melting point thereof in a molten state, to reliably obtain highly purified gas.

The present invention has been completed with the above view in mind and has an object to provide a gas purification apparatus and its related method in which, when gas is extracted from a vessel storing molten salt held at a temperature equal to or above a melting point thereof in a molten state, a major portion of salt accompanied with gas in a state of vapor, mist and fine particles is caused to return as molten liquid to molten salt stored in the vessel during which gas is caused to pass across a filter disposed in a downstream stage for thereby remarkably increasing a lifetime of the filter to minimize operational man-hours required for maintenance while achieving a remarkable reduction of salt in exhaust gas for thereby highly purifying gas.

Means for Solving the Problem

To achieve the object set forth above, a first aspect of the present invention provides a gas purification apparatus highly purifying a gas containing a salt derived from a molten salt stored in a vessel, comprising: a reflux mechanism liquefying the salt, contained in the gas, for return to the molten salt in the vessel; and a filtration mechanism disposed in an exhaust flow path of the gas on a downstream stage of the reflux mechanism.

A second aspect, in addition to the first aspect, of the present invention, provides the gas purification apparatus in which the reflux mechanism comprises a porous body disposed in the exhaust flow path of the gas communicated with the vessel, and a heater operative to set the porous body at a temperature equal to or above a melting point of the salt contained in the gas so as to melt the salt.

A third aspect, in addition to the second aspect, of the present invention provides the gas purification apparatus in which the porous body has a surface area set to a value of 5000 $cm^2 \cdot min/g$ or more per unit weight of the salt flowing into the porous body per unit time.

A fourth aspect, in addition to the second aspect or the third aspect, of the present invention provides the gas purification apparatus in which a gas flow rate of the gas, containing the salt and flowing into the porous body, is set to a value ranging from 0.1 cm/sec to 100 cm/sec.

A fifth aspect, in addition to the second aspect or the third aspect, of the present invention provides the gas purification apparatus in which the salt, contained in the gas passing through the porous body, is returned to the porous body.

A sixth aspect, in addition to any of the second aspect to the fifth aspect, of the present invention provides the gas purification apparatus in which the porous body has a main component including at least one kind of alumina, carbon, silica, silicon nitride, silicon carbide and boron nitride.

A seventh aspect, in addition to any of the second aspect to the sixth aspect, of the present invention provides the gas purification apparatus in which the porous body includes at least one kind of a porous structured product, a fibrous structured product and a filler product filled with a filler material.

An eighth aspect, in addition to any of the second aspect to the seventh aspect, of the present invention provides the gas purification apparatus in which a temperature of an area immediately ahead of the porous body into which the gas, containing the salt, flows is set to a value equal to or above the melting point of the salt.

A ninth aspect, in addition to the eighth aspect, of the present invention provides the gas purification apparatus in which the temperature of the area immediately ahead of the porous body into which the gas, containing the salt, flows is set to a value higher than the melting point of the salt by 200° C. or less.

A tenth aspect, in addition to any of the first aspect to the ninth aspect, of the present invention provides the gas purification apparatus in which the vessel includes a cover member disposed above the molten salt stored in the vessel to define an internal space whose upper temperature is set to a value less than a melting point of the salt.

An eleventh aspect, in addition to any of the first aspect to the tenth aspect, of the present invention provides the gas purification apparatus in which the filtration mechanism includes a filter capable of filtering the salt contained in the gas, and a heater set to keep the heater at a temperature of 100° C. or more.

A twelfth aspect, in addition to the eleventh aspect, of the present invention provides the gas purification apparatus in which the temperature of the filter is set to a value less than a melting point of the salt.

A thirteenth aspect, in addition to the eleventh aspect or the twelfth aspect, of the present invention provides the gas purification apparatus in which an air permeability of the filter is set to a value ranging from 1.0 $cm^3/(cm^2/sec)$ to 5.0 $cm^3/(cm^2/sec)$.

A fourteenth aspect, in addition to any of the eleventh aspect to the thirteenth aspect, of the present invention provides the gas purification apparatus in which the filter includes at least one kind of a felt material, a woven fabric material and a porous material formed using at least one of polytetrafluoroethylene, polypropylene, polyester and aramid, a glass cloth and a porous body having a main component of alumina silicate.

A fifteenth aspect, in addition to any of the first aspect to the fourteenth aspect, of the present invention provides the gas purification apparatus in which the exhaust flow path of the gas on a downstream stage of the reflux mechanism includes branch conduits.

A sixteenth aspect, in addition to the fifteenth aspect, of the present invention provides the gas purification apparatus in which temperatures of walls of the branch conduits are set to values equal to or higher than the melting point of the salt.

A seventeenth aspect, in addition to any of the first aspect to the sixteenth aspect, of the present invention provides the gas purification apparatus in which the gas is obtained by executing electrolysis of the molten salt stored in the vessel.

An eighteenth aspect, in addition to any of the first aspect to the seventeenth aspect, of the present invention provides the gas purification apparatus in which the molten salt includes zinc chloride.

A nineteenth aspect of the present invention provides a gas purification method highly purifying a gas containing a salt derived from a molten salt stored in a vessel, comprising: refluxing the salt, contained in the gas, through liquefying the salt for return to the molten salt in the vessel in the exhaust flow path of the gas; and filtering the salt, contained in the gas, as a downstream step of refluxing the salt.

Effect of the Invention

With the gas purification apparatus according to the first aspect of the present invention, there are provided the reflux mechanism liquefying the salt, contained in the gas, for return to the molten salt in the vessel, and the filtration mechanism disposed in the exhaust flow path of the gas on the downstream stage of the reflux mechanism. With such a structure, when gas is extracted from the vessel storing the molten salt held at a temperature equal to or above a melting point thereof in a molten state, a major portion of the salt accompanied with the gas in a state of vapor, mist and fine particles can be caused to return as molten liquid to the molten salt stored in the vessel, during which the gas can be filtered at the downstream stage for thereby remarkably increasing a lifetime of the filter to minimize operational man-hours required for maintenance while achieving a remarkable reduction of the salt in exhaust gas for thereby highly purifying the gas.

With the gas purification apparatus according to the second aspect of the present invention, further, the reflux mechanism comprises the porous body disposed in the exhaust flow path of the gas communicated with the vessel, and the heater operative to set the porous body at the temperature equal to or above the melting point of the salt contained in the gas so as to melt the salt. This allows the major portion of the salt, accompanied with the gas in the state of vapor, mist and fine particles, to be made into the molten liquid for return to the molten salt stored in the vessel.

With the gas purification apparatus according to the third aspect of the present invention, furthermore, the porous body has the surface area set to the value of 5000 $cm^2 \cdot min/g$ or more per unit weight of the salt flowing into the porous body per unit time. This allows the reflux mechanism to reliably exhibit a function of returning the major portion of the salt, accompanied with the gas in the state of vapor, mist and fine particles, as the molten liquid to the molten salt stored in the vessel.

With the gas purification apparatus according to the fourth aspect of the present invention, moreover, the gas flow rate of the gas, containing the salt and flowing into the porous body, is set to the value ranging from 0.1 cm/sec to 100 cm/sec. This allows the reflux mechanism to more reliably exhibit the function of returning the major portion of the salt, accompanied with the gas in the state of vapor, mist and fine particles, as the molten liquid to the molten salt stored in the vessel.

With the gas purification apparatus according to the fifth aspect of the present invention, besides, the salt, contained in the gas passing through the porous body, is returned to the porous body. This result in an increase in the amount of liquid film of the salt formed inside the porous body such that the liquid film allows the salt accompanied with the gas in the states of vapor, mist and file particles to be taken thereinto. Thus, the reflux mechanism allows the salt to be made into the molten liquid for return to the molten salt stored in the vessel in a further efficient fashion.

With the gas purification apparatus according to the sixth aspect of the present invention, in addition, the porous body has the main component including at least one kind of alumina, carbon, silica, silicon nitride, silicon carbide and boron nitride. This reliably suppresses the occurrence of deterioration in material of the porous body even under a condition continuously exposed to the vapor, mist and fine particles of the molten salt remained at high temperatures equal to or above the melting point. This allows the reflux mechanism to more reliably exhibit the function of returning the major portion of the salt, accompanied with the gas in the state of vapor, mist and fine particles, as the molten liquid to the molten salt stored in the vessel.

With the gas purification apparatus according to the seventh aspect of the present invention, further, the porous body includes at least one kind of the porous structured product, the fibrous structured product and the filler product filled with the filler material. This allows the reflux mechanism to reliably exhibit the function of returning the major portion of the salt, accompanied with the gas in the state of vapor, mist and fine particles, as the molten liquid to the molten salt stored in the vessel with a simplified structure.

With the gas purification apparatus according to the eighth aspect of the present invention, furthermore, the temperature of the area immediately ahead of the porous body into which the gas, containing the salt, flows is set to the value equal to or above the melting point of the salt. This allows the reflux mechanism to reliably exhibit the function of returning the major portion of the salt, accompanied with the gas in the state of vapor, mist and fine particles, as the molten liquid to the molten salt stored in the vessel without depending on a temperature condition of the gas flow path in a preceding upstream stage thereof.

With the gas purification apparatus according to the ninth aspect of the present invention, moreover, the temperature of the area immediately ahead of the porous body into which the gas, containing the salt, flows is set to the value higher than the melting point of the salt by 200° C. or less. This allows the reflux mechanism to reliably exhibit the function of returning the major portion of the salt, accompanied with the gas in the state of vapor, mist and fine particles, as the molten liquid to the molten salt stored in the vessel while suppressing electric power consumption or the like of the apparatus as a whole.

With the gas purification apparatus according to the tenth aspect of the present invention, besides, the vessel includes the cover member disposed above the molten salt stored in the vessel to define the internal space whose upper temperature is set to the value less than the melting point of the salt. This allows the reflux mechanism to reliably exhibit the function of returning the major portion of the salt, accompanied with the gas in the state of vapor, mist and fine particles, as the molten liquid to the molten salt stored in the vessel with a reduction in the amount of salt accompanied with the gas in the state of vapor, mist and fine particles.

With the gas purification apparatus according to the eleventh aspect of the present invention, in addition, the filtration mechanism includes the filter filtering the salt contained in the gas, and the heater set to keep the heater at the temperature of 100° C. or more for thereby filtering the salt passing across the reflux mechanism and accompanied with the gas in the state of vapor, mist and fine particles. This can suppress the salt, passing across the reflux mechanism and accompanied with the gas under the states of vapor, mist and fine particles, from adhering onto the filter in a hydrate salt state due to the influence of moisture adhered onto the filer. This enables the gas to be highly purified while preventing the pressure inside the apparatus from increasing in excess with a remarkable reduction in the salt in the exhaust gas.

With the gas purification apparatus according to the twelfth aspect of the present invention, further, the temperature of the filter is set to the value less than the melting point of the salt. This can suppress the salt, passing across the reflux mechanism and accompanied with the gas in the state of vapor, mist and fine particles, from undesirably molten inside the filter with an effect of precluding the occurrence of clogging of the filter. This enables the filtration mechanism to reliably exhibit a function of filtering the salt passing across the reflux mechanism and accompanied with the gas in the states of vapor, mist and fine particles.

With the gas purification apparatus according to the thirteenth aspect of the present invention, furthermore, the air permeability of the filter is set to the value ranging from 1.0 $cm^3/(cm^2/sec)$ to 5.0 $cm^3/(cm^2/sec)$. This allows the filter to collect 95% or more of the salt with a particle diameter falling in a value ranging from 0.1 μm to 0.5 μm. This enables the filtration mechanism to further reliably exhibit the function of filtering the salt passing across the reflux mechanism and accompanied with the gas in the states of vapor, mist and fine particles.

With the gas purification apparatus according to the fourteenth aspect of the present invention, moreover, the filter includes at least one kind of the felt material, the woven fabric material and the porous material formed using at least one of polytetrafluoroethylene, polypropylene, polyester and aramid, the glass cloth and the porous body having the main component of alumina silicate. This enables the filtration mechanism to reliably exhibit the function of filtering the salt passing across the reflux mechanism and accompanied with the gas in the state of vapor, mist and fine particles in a simplified structure while achieving a long lifetime of the filter.

With the gas purification apparatus according to the fifteenth aspect of the present invention, besides, the exhaust flow path of the gas between the reflux mechanism and the filtration mechanism includes branch conduits. Even if the salt, passing across the reflux mechanism and accompanied with the gas in the state of vapor, mist and fine particles, is stuck onto the exhaust flow path, the branch conduit can be disconnected for removing the salt stuck onto the interior. This enables the filtration mechanism to reliably exhibit the function of filtering the salt passing across the reflux mechanism and accompanied with the gas in the state of vapor, mist and fine particles with a remarkable reduction in the amount of salt in the exhaust gas, thereby highly purifying the gas.

With the gas purification apparatus according to the sixteenth aspect of the present invention, in addition, temperatures of walls of the branch conduits are set to values equal to or higher than the melting point of the salt. This allows the salt, stuck onto the interior, to be molten for removal without disconnecting the branch conduits from one another. This enables the filtration mechanism to reliably exhibit the function of filtering the salt passing across the reflux mechanism and accompanied with the gas in the state of vapor, mist and fine particles with a remarkable reduction in the amount of salt in the exhaust gas, thereby highly purifying the gas.

With the gas purification apparatus according to the seventeenth aspect of the present invention, further, the gas is obtained by executing electrolysis of the molten salt stored in the vessel. Thus, even when extracting electrolytic product gas generated when the molten salt is electrolyzed, it becomes possible to remarkably reduce the salt in the exhaust gas, thereby enabling purification of the electrolytic product gas.

With the gas purification apparatus according to the eighteenth aspect of the present invention, furthermore, even under a circumstance where the molten salt contains zinc chloride, the salt, derived from zinc chloride, can be remarkably reduced in the exhaust gas for thereby highly purifying the gas. That is, such a gas purification apparatus can exhibit technical significance particularly when applied with a vessel, like an electrolytic cell used when electrolyzing a molten salt of zinc chloride, which is required to retain the molten salt at a temperature higher than the melting point thereof by 100° C. or more.

With the gas purification apparatus according to the nineteenth aspect of the present invention, moreover, the gas purification method comprises: refluxing the salt, contained in the gas, through liquefying the salt for return to the molten salt in the vessel in the exhaust flow path of the gas containing the salt; and filtering the salt, contained in the gas, as a downstream step of refluxing the salt. With such a provision, when gas is extracted from the vessel storing the molten salt held at a temperature equal to or above a melting point thereof in a molten state, a major portion of the salt accompanied with the gas in a state of vapor, mist and fine particles can be caused to return as molten liquid to the molten salt stored in the vessel, during which the gas can be filtered at the downstream stage for thereby remarkably increasing a lifetime of the filter to minimize operational man-hours required for maintenance while achieving a remarkable reduction of the salt in exhaust gas for thereby highly purifying the gas.

BRIEF DESCRIPTION OF THE DRAWINGS

FIG. 3 is a table representing test conditions and test results in case that gas was highly purified using the gas purification apparatus of the present embodiment.

EMBODIMENT FOR CARRYING OUT THE INVENTION

Now, a gas purification apparatus and its related method of an embodiment according to the present invention will be described below in detail with suitable reference to the accompanying drawings. Throughout the drawings, x-axis and z-axis constitute a two-axis orthogonal coordinate system with a direction parallel to the z-axis representing a vertical direction. Also, a positive direction of the z-axis is referred to as an upward direction and a negative direction of the z-axis is referred to as a downward direction, respectively.

Figure 1:
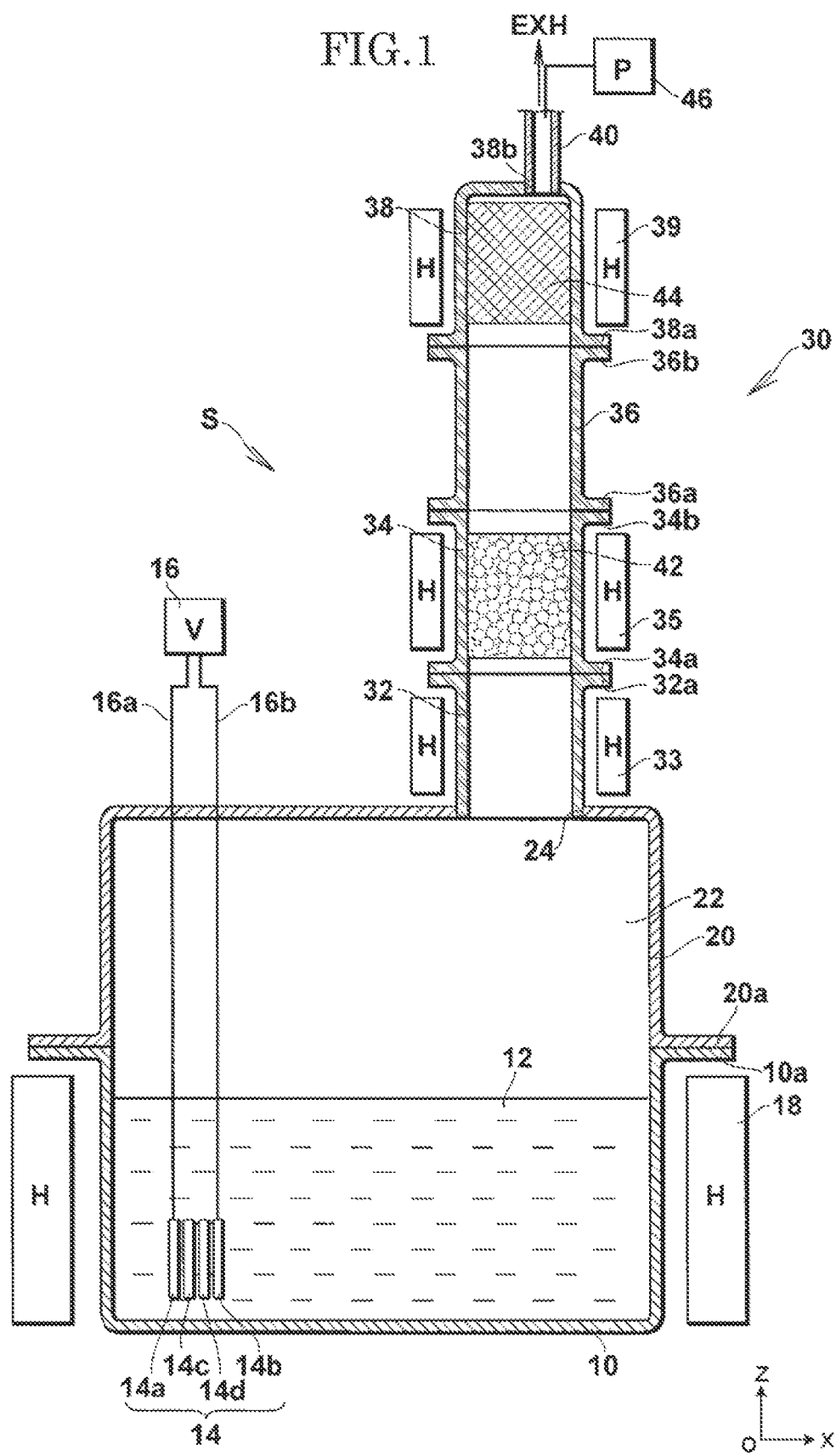
FIG. 1 is a schematic vertical cross-sectional view showing a structure of a gas purification apparatus of an embodiment according to the present invention.

FIG. 1 is a schematic vertical cross-sectional view showing a structure of the gas purification apparatus of the present embodiment.

As shown in FIG. 1, the gas purification apparatus S is provided with a molten salt storage vessel 10, a cover 20 mounted on the molten salt storage vessel 10, and an exhaust tower 30 mounted on the cover 20.

More particularly, the molten salt storage vessel 10, made of carbon and formed in a cylindrical shape a bottom of which is closed, stands upright to store molten salt 12 therein, typically. An example of such molten salt 12 may typically include, but is not limited to, molten metal salt such as molten zinc chloride.

An electrode body 14, including a pair of plate electrodes 14a and 14b and a pair of intermediate plate electrodes 14c and 14d sandwiched between the pair of plate electrodes 14a and 14b, is immersed in the molten salt 12 stored in the molten salt storage vessel 10. Both the plate electrodes 14a and 14b and the intermediate plate electrodes 14c and 14d, typically made of carbon, extend in the vertical direction in face-to-face relationships, correspondingly. Further, the pair of plate electrodes 14a and 14b are connected to a power supply 16 via a pair of associated conductive wires 16a and 16b, respectively. In addition, a heater 18 is disposed in a way to surround an outer periphery of a cylindrical wall of the molten salt storage vessel 10 in such a manner that the internally stored molten salt 12 therein is maintained equal to or above a melting temperature to be maintained in a molten state. Although only two pieces of the intermediate plate electrodes 14c and 14d are shown in FIG. 1, a total number of pieces of the intermediate plate electrodes 14c and 14d includes, but is not limited to, three pieces or more depending on needs. Moreover, the electrode body 14 may take the form of a structure composed of only the pair of plate electrodes 14a and 14b in the absence of the intermediate plate electrodes 14c and 14d for simplification of the structure thereof.

When the power supply 16 causes electric current to flow into the electrode body 14 via the conductive wires 16a and 16b for executing electrolysis, metal is generated in the form of an electrolytic product, which is in a molten state, from the molten salt 12 stored in the molten salt storage vessel 10. Here, due to a difference in a specific weight of such generated metal with respect to that of the molten salt 12, the generated metal moves upward or downward. On one hand, simultaneously, electrolytic product gas is generated, and, due to a difference in a specific weight of such generated gas with respect to that of the molten salt 12, the generated gas moves upward. In this moment, vapor is caused to possibly generate with liquid droplets being caused to possibly spatter, both emanating from the molten salt 12 kept at a high temperature in the molten salt storage vessel 10.

The cover 20, made of metal such as stainless steel alloy, has a cylindrical shape which has a top wall closed at an upper part thereof, typically. Further, the cover 20 is mounted on and fixed to the molten salt storage vessel 10 at a top thereof in abutting engagement between a flange 20a, formed on the cover 20 at a lower end thereof, and a flange 10a formed on the molten salt storage vessel 10 at an upper end thereof.

The cover 20 defines an internal space 22 in an area above a liquid surface of the molten salt 12 stored in the molten salt storage vessel 10 and has the top wall formed with an insertion hole 24 to which a lower end of the exhaust tower 30 is inserted. In addition, the pair of conductive wires 16a and 16b vertically extend through insertion holes, which are not shown in the drawings, formed on the top wall of the cover 20.

Here, electrolytic product gas, generated inside the molten salt storage vessel 10 and moves upward, is filled in the internal space 22 to reach the insertion hole 24 formed on the cover 20 at the top wall thereof. When this takes place, an outer wall, such as a cylindrical wall, of the cover 20 is generally held in contact with air kept at a stabilized temperature as a whole without occurrence of a portion in which a specific variation in a wall temperature of the cover 20 takes place, and the wall temperature of the cover 20 is continuously lowered from a lower side thereof to an upper side thereof. This causes electrolytic product gas, present in the internal space 22, to have a temperature that is also continuously lowered from a lower side to an upper side in the internal space 22.

Further, in a general way, even when no attempt is made to positively execute a control, for instance, by setting a height of the cover 20 to have a sufficiently increased dimension, it results in likelihood that the temperature of electrolytic product gas, present in the internal space 22 at an upper area thereof, reaches a value below a melting point of the molten salt 12. In such a case, it is expected that such as vapor, possibly generated from the molten salt 12 kept at a high temperature, and liquid droplets, possibly spattered from the molten salt 12 kept at a high temperature, are possibly changed to mist or fine particles to return to the molten salt 12 stored in the molten salt storage vessel 10. However, the reality is that once vapor, mist and fine particles derived from the molten salt 12 are generated, a major portion thereof is likely to be accompanied with electrolytic product gas to blow off into the exhaust tower 30 disposed on a subsequent downstream stage of the molten salt storage vessel 10 having the cover 20.

That is, electrolytic product gas, present in the internal space 22 of the cover 20 at the upper area thereof, may be preferable to be uniformly maintained at a temperature less than the melting point of the molten salt 12 in such a manner that vapor, generated from the molten salt 12 stored in the molten salt storage vessel 10, and mist and fine particles, resulting from spattered liquid droplets emanated from the molten salt 12 stored in the molten salt storage vessel 10, may return to the molten salt 12 as much as possible, not so as to be undesirably blown off to the exhaust tower 30 while being accompanied with electrolytic product gas. Here, this may be accomplished by taking the internal space 22 with an adequately increased height or by taking a structure including the provision of a cooling mechanism or the like, which is not shown in the drawings. However, even if the attempt is made to control the temperature of electrolytic product gas present at the upper area of the internal space 22 of the cover 20 in such a way, there is some limitation in such efforts. Therefore, it is more likely difficult in view of a realistic device structure to completely restrain the occurrence of a phenomenon in which vapor, mist and fine particles, derived from the molten salt 12 stored in the molten salt storage vessel 10, are undesirably blown off to the exhaust tower 30 while being accompanied with electrolytic product gas.

The exhaust tower 30 is provided with a first delivery conduit 32, a second delivery conduit 34, a third delivery conduit 36, a fourth delivery conduit 38 and an exhaust delivery conduit 40, which are typically made of carbon and disposed in this order from a lower side to an upper side of the exhaust tower 30 for extracting electrolytic product gas. The first delivery conduit 32, the second delivery conduit 34, the third delivery conduit 36 and the exhaust delivery conduit 40 are comprised of vertically extending cylindrical single tubes, respectively. In contrast, the fourth delivery conduit 38 takes the form of a structure including a vertically extending cylindrical single tube with an upper portion thereof being closed by a top wall.

With such an exhaust tower 30, the first delivery conduit 32 has a lower end portion inserted through and fixed to the insertion hole 24 formed on the cover 20 at the top wall thereof, and the second delivery conduit 34 is mounted on and fixed to the first delivery conduit 32 in such a manner that a flange 32a formed at an upper end portion of the first delivery conduit 32 and a flange 34a formed at a lower end portion of the second delivery conduit 34 are held in abutting engagement with each other. The third delivery conduit 36 is mounted on and fixed to the second delivery conduit 34 in such a manner that a flange 34b formed at an upper end portion of the second delivery conduit 34 and a flange 36a formed at a lower end portion of the third delivery conduit 36 are held in abutting engagement with each other. The fourth delivery conduit 38 is mounted on and fixed to the third delivery conduit 36 in such a manner that a flange 36b formed at an upper end portion of the third delivery conduit 36 and a flange 38a formed at a lower end portion of the fourth delivery conduit 38 are held in abutting engagement with each other. In addition, the fourth delivery conduit 38 has a top wall formed with an insertion hole 38b to which a lower end portion of the exhaust delivery conduit 40 is inserted and fixed for expelling electrolytic product gas to the outside.

Further, heaters 33, 35 and 39 are disposed to the first delivery conduit 32, the second delivery conduit 34 and the fourth delivery conduit 38, correspondingly, so as to surround outer peripheries of respective cylindrical walls of the first delivery conduit 32, the second delivery conduit 34 and the fourth delivery conduit 38 to keep the insides thereof at predetermined temperatures. Furthermore, a porous body 42 is accommodated inside the second delivery conduit 34 and has an outer periphery held in abutting engagement with an internal wall of the second delivery conduit 34. A filter 44 is accommodated inside the fourth delivery conduit 38 and has an outer periphery held in abutting engagement with an internal wall of the fourth delivery conduit 38. In addition, a pump 46 is connected to the exhaust delivery conduit 40 to apply electrolytic product gas with a pressure to flow electrolytic product gas upward through the insides of the first delivery conduit 32, the second delivery conduit 34, the third delivery conduit 36, the fourth delivery conduit 38 and the exhaust delivery conduit 40 in such a manner that electrolytic product gas is caused to flow from the lower side to the upper side therethrough at a predetermined flow rate so as to be expelled to the outside. Though not shown in the drawings, heat insulation materials are mounted in desired positions along outer peripheries of respective cylindrical walls of the first delivery conduit 32, the second delivery conduit 34, the third delivery conduit 36 and the fourth delivery conduit 38, respectively. Though not shown in the drawings, moreover, it doesn't matter if a heater is mounted so as to surround the outer periphery of the cylindrical wall of the third delivery conduit 36 in such a manner that the inside thereof kept at a predetermined temperature.

Now, structures of the porous body 42, disposed inside the second delivery conduit 34, and the filter 44, disposed inside the fourth delivery conduit 38, will be described below in more detail. Here, the porous body 42, disposed inside the second delivery conduit 32, and the heater 35, disposed around the second delivery conduit 34, constitute a reflux mechanism for realizing a function of causing salt, contained in vapor, mist and fine particles derived from the molten salt 12, to be liquefied so as to form liquid droplets and returned in the form of such liquid droplets to the inside of the molten salt storage vessel 10. In addition, the filter 44, disposed inside the fourth delivery conduit 38, and the heater 39, disposed around the fourth delivery conduit 38, constitute to a filtration mechanism for realizing a function to collect and filter salt contained in vapor, mist and fine particles derived from the molten salt 12 on a downstream stage of the reflux mechanism.

First, the porous body 42, disposed inside the second delivery conduit 34, is provided for making a countermeasure concerning vapor, mist and fine particles, derived from the molten salt 12 inside the molten salt storage vessel 10 and flowing into the exhaust tower 30 through the insertion hole 24 provided in the top wall of the cover 20 while being accompanied with electrolytic product gas. That is, the porous body 42 has a function specifically to trap mist derived from the molten salt 12 and melt fine particles derived from the molten salt 12, respectively, so as to form liquid droplets of salt in cooperation with the heater 35 disposed around the second delivery conduit 34 in such a manner that such liquid droplets are caused to return to the molten salt storage vessel 10 via the first delivery conduit 32. From a point of view on such a function, particularly, the porous body 42 needs to be composed of a porous body maintained at the temperature equal to or above the melting point of the molten salt 12 and having an increased contact surface area with respect to electrolytic product gas.

More particularly, in principle, the porous body 42 is required to take a structure, employing at least one kind of a porous structured product, a fibrous structured product and a filler product filled with filler material formed in an arbitrary shape, which has an increased specific contact surface area with respect to electrolytic product gas with a decreased volume. An example of material of such a porous body 42 may include at least one of alumina, silica, silicon carbide, silicon nitride, boron nitride and carbon when taken into account the material to be used under a condition exposed to vapor, mist and fine particles derived from the molten salt 12 remaining at a high temperature equal to or above the melting point thereof. From the point of view of minimizing the occurrence of deterioration in material of the porous body 42, alumina, silicon carbide, silicon nitride and boron nitride may be more preferably employed in a single use or in a suitable combination thereof.

Also, mist and fine particles, derived from the molten salt 12 and flowing into the porous body 42, are brought into contact not only with the porous body 42 per se but also with liquid films of salt formed inside the porous body 42 and resultantly absorbed into such liquid films to be more efficiently removed. Such liquid films are formed in such a manner that salt, contained in electrolytic product gas flowing into the porous body 42, is adhered to surfaces or pores of the porous body 42. Therefore, the porous body 42 may preferably take a material and a shape that can stably form such liquid films. From the point of such a view, the porous body 42 of such a structure can be preferably used in actual practice.

In order for such a function of the porous body 42 to be adequately and reliably exhibited, it is extremely important for a total surface area (preferably hereinafter, merely referred to as a surface area), which is composed of an external surface area and an internal surface area, both of the porous body 42, available to be brought into contact with vapor, mist and fine particles derived from the molten salt 12, to be optimally controlled per unit weight of salt, derived from the molten salt 12 flowing into the porous body 42 per unit time. This effectively allows a phenomenon to occur in such a manner that vapor, mist and fine particles, derived from the molten salt 12, are brought into contact with porous-body structured components in the porous body 42 to form liquid droplets for return to the molten salt storage vessel 10. From such a point, in the porous body 42, the surface area thereof may be preferably set to be 5000 $cm^2 \cdot min/g$ or more per unit weight of salt (preferably hereinafter, merely referred to as unit weight of salt), which is contained in vapor, mist and fine particles derived from the molten salt 12 and flowing into the porous body 42 per unit time.

Further, concerning a gas flow rate of electrolytic product gas, flowing into the porous body 42, there is a phenomenon and a tendency described below. That is, even when the porous body 42 has the surface area set to be 5000 $cm^2 \cdot min/g$ or more per unit weight of salt derived from the molten salt 12 and flowing into the porous body 42 per unit time, in case that the gas flow rate of electrolytic product gas increases in excess, there is a phenomenon and a tendency in which liquid droplets, trapped in the porous body 42, are blown off to the third delivery conduit 36 on a subsequent downstream stage. In contrast, even with such surface area of the porous body 42, in case that the gas flow rate of electrolytic product gas is too small, there is a phenomenon and a tendency in which a decrease in the amounts of vapor, mist and fine particles, derived from the molten salt 12 and accompanied with electrolytic product gas, is occurred in theory, whereas the porous body 42 has an increase in permeability of vapor, mist and fine particles derived from the molten salt 12 with a resultant decrease in removing performance of the porous body 42 for such vapor, mist and fine particles. From the point of such a view, the gas flow rate of electrolytic product gas flowing into the porous body 42, viz., the gas flow rate of electrolytic product gas flowing through the first delivery conduit 32, the second delivery conduit 34, the third delivery conduit 36, the fourth delivery conduit 38 and the exhaust delivery conduit 44 constituting the exhaust tower 30, may be preferably set to a value ranging from 0.1 cm/sec to 100 cm/sec. In addition, the gas flow rate of electrolytic product gas, flowing into the porous body 42, may be controlled by suitably setting up an expelling performance of the pump 46 connected to the interiors of the first delivery conduit 32, the second delivery conduit 34, the third delivery conduit 36, the fourth delivery conduit 38 and the exhaust delivery conduit 44.

Meanwhile, when the surface area of the porous body 42 may be set to 5000 $cm^2 \cdot min/g$ or more per unit weight of salt derived from the molten salt 12 and flowing into the porous body 42 per unit time, the gas flow rate of electrolytic product gas, flowing into the porous body 42, may be typically set to a value as that lower than 0.1 cm/sec. With such a setup, it may be possible to employ a structure that can efficiently cope with vapor, mist and fine particles derived from the molten salt 12 to be accompanied with electrolytic product gas to flow into the porous body 42.

More particularly, such a structure enables salt, included in electrolytic product gas passed through the porous body 42, to be returned to the porous body 42 with a resultant increase in the amount of salt flowing into the porous body 42, thereby increasing the amount of liquid films of salt mainly formed in pores of the porous body 42. That is, such a structure has a function to cause a part of salt collected in the filter 44 of the filtration mechanism, disposed on the downstream stage of the reflux mechanism employing the porous body 42, and a part of salt stuck to the third delivery conduit 36, disposed between the reflux mechanism and the filtration mechanism, to return to the porous body 42 of the reflux mechanism. Here, since such salt is firmly adhered onto or attached in a powder form to the surface of the filter 44 and the inner wall surface of the third delivery conduit 36, such salt may suffice to be mechanically peeled off or heated up at the temperature equal to or above the melting point thereof to be melted so as to be dropped into the porous body 42. An example of the structure for mechanically peeling off the attached salt in the powder form may include a vibration mechanism, which is not shown in the drawings, for applying the filter 44 of the filtration mechanism with vibration. An example of the structure for heating up and melting the adhered salt in the powder form at the temperature equal to or above the melting point may suffice to include a structure operative to be heated by an electric heater. In addition, depending on process conditions in carrying out electrolysis of the molten salt 12, there is likelihood that the attached salt in the powder form is loosely attached, and in such a case, the loosely attached salt may be allowed to drop under its own weight in nature.

Further, concerning the temperature of the porous body 42 per se, there is a need for the porous body 42 that the porous body 42 is to be brought into contact with vapor, mist and fine particles, derived from the molten salt 12 and accompanied with electrolytic product gas, so as to change them each in a liquid-droplet state. From the point of view of causing salt in such a liquid-droplet state to be returned to the molten salt 12 in the molten salt storage vessel 10, in principle, the temperature of the porous body 42 per se needs to be kept at a value equal to or above the melting point of the molten salt 12 at all process times. More strictly, when setting the temperature of the porous body 42 to be too close to the melting point of the molten salt 12, clogging of the porous body 12 may be occurred, due to an increase in viscosity of liquid droplets, obtained from vapor, mist and fine particles or due to a decrease in temperature of a part of the porous body 42 to a value equal to or below the melting point of the molten salt 12. Therefore, when controlling a wall temperature of the cylindrical wall of the second delivery conduit 34, such a wall temperature may be preferably controlled at a temperature higher than the melting point of the molten salt 12 by a value ranging from 50° C. to 150° C. On one hand, if the wall temperature of the cylindrical wall of the second delivery conduit 34 is increased in excess, a vapor pressure of molten salt present inside the porous body 42 increases. This results in deterioration of performance of the porous body 42 (viz., an increase in molten salt permeability of the porous body 42). In addition, a device structure becomes complicated in view of thermal strength and an amount of consumption energy or the like. Therefore, in actual practice, an upper limit of such a temperature may be preferably set to a value higher than the melting point of the molten salt 12 by a value of 150° C. Moreover, such a control of the porous body 42 in temperature is executed by suitably determining an amount of heat developed by the heater 35 disposed surrounding the outer periphery of the cylindrical wall of the second delivery conduit 34. In addition, the temperature of the porous body 42 may be controlled upon directly introducing a heater having a protective cover, which is not shown in the drawings, into the second delivery conduit 34. In such a case, a control may suffice to be performed within a temperature range of a control temperature higher than the melting point of the molten salt 12 by a value ranging from 20° C. to 110° C.

For a temperature of the porous body 42 in a primary side, viz., the temperature in an area immediately ahead of the porous body 42 on an upstream thereof, further, even if the temperature of electrolytic product gas, accompanying vapor, mist and fine particles derived from the molten salt 12 and flowing into the first delivery conduit 32, lies at any value, the porous body 42 needs to liquefy vapor, mist and fine particles, derived from the molten salt 12, for return under the liquid-droplet state to the molten salt 12 in the molten salt storage vessel 10. Thus, the temperature in the area immediately ahead of the porous body 42 (preferably hereinafter, merely referred to as a primary side temperature), into which electrolytic product gas flows, may be preferably set to a value equal to or above the melting point of the molten salt 12. Meanwhile, increasing the primary side temperature of the porous body 42 to a value in excess merely results in the occurrence of a complicated device structure in view of a thermal strength and an amount of consumption energy or the like. Therefore, an upper limit of the primary side temperature may be preferably set to a value that is higher than the melting point of the molten salt 12 by 200° C. or less in actual practice. In addition, the temperature of the primary side temperature of the porous body 42 may be controlled by suitably setting an amount of heat developed by the heater 33 disposed surrounding the outer periphery of the cylindrical wall of the first delivery conduit 32.

Next, the filter 44, disposed inside the fourth delivery conduit 38, may suffice to be a bag filter having a structure exhibiting a heat-resisting characteristics with a capability to collecting vapor, mist and fine particles, derived from the molten salt 12, because a minute amount of vapor, mist and fine particles, derived from the molten salt 12, is passed through the porous body 42 disposed inside the second delivery conduit 34. An example of such a filter 44 may include a filter composed of at least one of a felt material, a woven fabric material and a porous material, respectively formed of PTFE (polytetrafluoroethylene), polypropylene, polyester and aramid in single use or in suitable combination thereof, and a glass cloth. However, if a porous body filter, made of alumina silicate, is used as the filter 44, a pressure loss increases with a lengthy period and, hence, such a filter is more preferably used in the light of an effective lifetime of use. Of course, the filter 44 is constituted by employing such materials in single use or in suitable combination thereof.

With regard to a temperature of the filter 44 disposed inside the fourth delivery conduit 38, moreover, the temperature of the filter 44 per se needs to be kept equal to or more 100° C. This is because, due to the influence of moisture adsorbed in the filter 44 during installation of the apparatus or when opening of the fourth delivery conduit 38, it is likely that if the temperature of the filter 44 per se is less than 100° C., vapor, mist and fine particles, derived from the molten salt 12, become in a hydrate salt state to be adhered onto the filter 44 so as to close interior of the filter 44 and, resultantly, an excessive increase occurs in pressure of the molten salt storage vessel 10 or the like. In addition, an upper limit temperature of the filter 44 per se may be preferably set to be less than the melting point of the molten salt 12 so as to prevent the undesired melting of vapor, mist and fine particles, derived from the molten salt 12, to be adhered onto the filter 44 to cause the clogging of the interior thereof. In addition, the temperature of the filter 44 may be controlled by suitably setting an amount of heat developed by the heater 39 disposed surrounding the outer periphery of the cylindrical wall of the fourth delivery conduit 38.

Further, an air permeability of the filter 44, disposed inside the fourth delivery conduit 38, may be preferably set to a value ranging from 1.0 cm³/(cm²/sec) to 5.0 cm³/(cm²/sec) such that the filter 44 can collect 95% or more of salt, which is included in electrolytic product gas passed through the porous body 42 and has a particle diameter ranging from 0.1 µm to 0.5 µm.

Various conditions, described above, may be suitably determined in relevant ranges to obtain adequate effects in actual practice in consideration of equipment cost or the like. Also, a controller may be provided, though not shown in the drawings, to control various component parts on programs, or an operator may manually operate the various component parts to make respective appropriate controls.

Besides, with the present embodiment, a long distance may be set between the porous body 42, disposed inside the second delivery conduit 34, and the filter 44 disposed inside the fourth delivery conduit 38. In case that the third delivery conduit 36 correspondingly set to have a long tubular length, a structure can be adopted as described below and will be described below in detail further with reference to FIG. 2.

Figure 2:
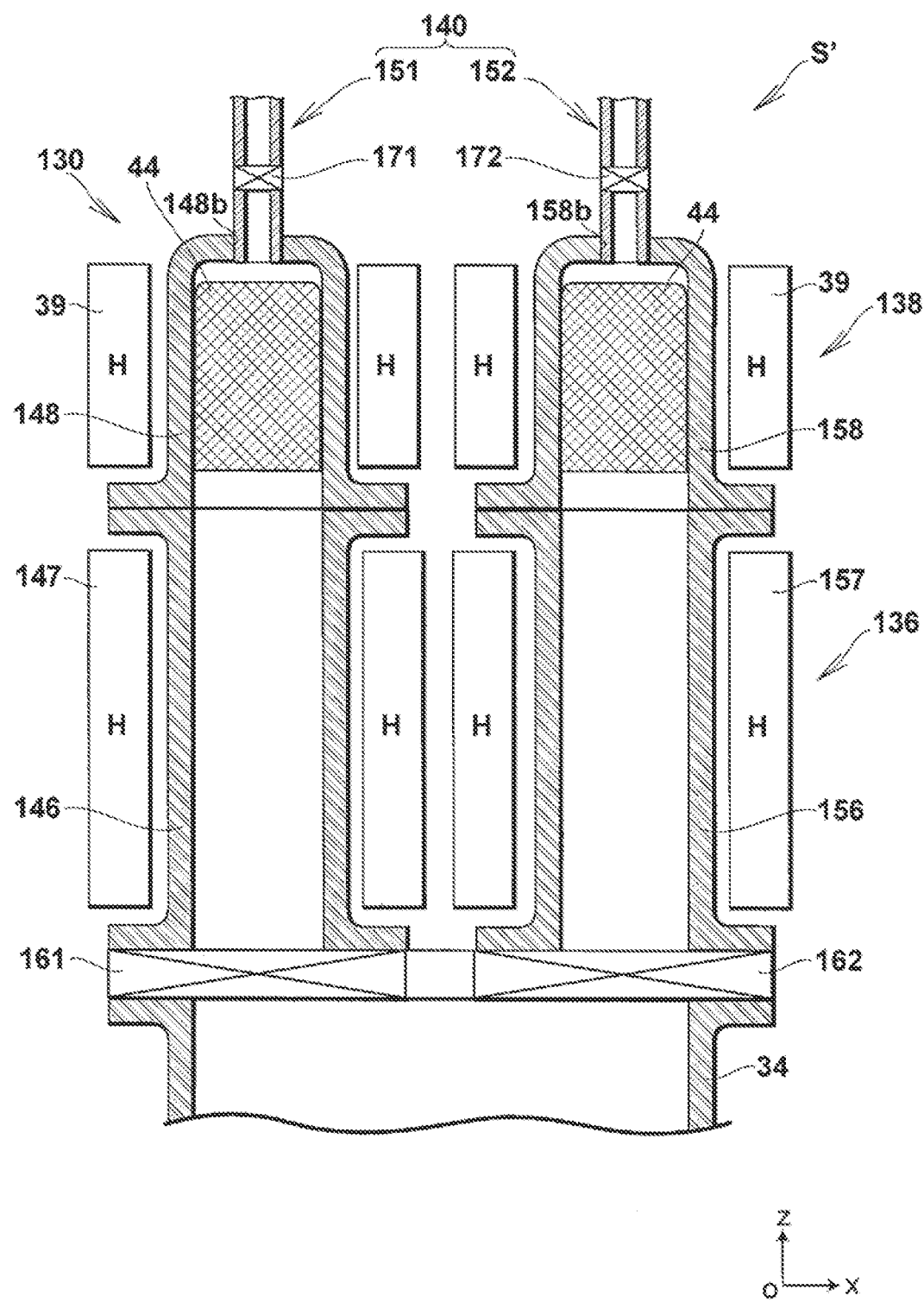
FIG. 2 is a fragmentary enlarged view showing a structure of branch conduits employed in the gas purification apparatus of a modified form of the present embodiment.

FIG. 2 is a fragmentary enlarged vertical cross-sectional view showing a structure of branch delivery conduits employed in a gas purification apparatus of a modified form of the present embodiment.

The gas purification apparatus S' of the modified form of the present embodiment differs mainly in structure from the gas purification apparatus S set forth above in that an exhaust tower 130 includes a third delivery conduit 136, a fourth delivery conduit 138 and an exhaust delivery conduit 140, all of which are placed on the second delivery conduit 34 in order in the form of branch delivery conduits, respectively. Remaining structures remained unchanged. Therefore, such a modified form of the present embodiment will be described below with a focus on such differing points with the same component parts bearing like reference numerals to suitably omit or simplify relevant descriptions.

As shown in FIG. 2, in particular, the third delivery conduit 136 includes a first branch conduit 146 and a second branch conduit 156 which are typically made of carbon and include vertically extending single cylindrical tubes, respectively. Heaters 147 and 157 are correspondingly mounted on the first branch conduit 146 and the second conduit 156 of the third delivery conduit 136 so as to surround outer circumferences of respective cylindrical walls thereof.

Further, a valve 161 is interposed between the first branch conduit 146 of the third delivery conduit 136 and the second delivery conduit 34, and a valve 162 is interposed between the second branch conduit 156 of the third delivery conduit 136 and the second delivery conduit 34.

The fourth delivery conduit 138 includes a third branch conduit 148 and a fourth branch conduit 158 which are typically made of carbon and include vertically extending single cylindrical tubes with upper portions thereof being closed by top walls, respectively. Heaters 39 are mounted on the third branch conduit 148 and the fourth conduit 158 of the fourth delivery conduit 138 so as to surround outer circumferences of respective cylindrical walls thereof, and filters 44 are disposed inside the third branch conduit 148 and the fourth branch conduit 158, respectively.

The exhaust delivery conduit 140 includes a fifth branch conduit 151 and a sixth branch conduit 152 which are typically made of carbon and include vertically extending single cylindrical tubes, respectively. The fifth branch conduit 151 and the sixth branch conduit 152 of the exhaust delivery conduit 140 are inserted and fixed to insertion holes 148b and 158b formed on the top walls of the third branch conduit 148 and the fourth branch conduit 158 of the fourth delivery conduit 138, respectively. Moreover, it doesn't matter if the fifth branch conduit 151 and the sixth branch conduit 152 are put into one discharge flow passage in respective upper areas thereof, viz., on respective subsequent downstream stages thereof.

Further, the fifth branch conduit 151 and the sixth branch conduit 152 of the exhaust delivery conduit 140 are provided with associated valves 171 and 172, respectively.

With such a structure, in case that the long distance is set between the porous body 42 and the filter 44 with an increase in length of the third delivery conduit 136 or the gas purification apparatus S' is continuously operated for a long period of time, it is predicted that salt, contained in a slight amount of vapor, mist and fine particles derived from the molten salt 12 and passing across the porous body 42 disposed inside the second delivery conduit 34, is caused to adhere onto the interior of the third delivery conduit 136 and the filter 44 disposed inside the fourth delivery conduit 138. This may result in the occurrence of these component parts being clogged with a rapid increase in pressure loss. Even when this possibly take place, the occurrence of such situations can be reliably prevented without halting the operation of the gas purification apparatus S'.

More particularly, for instance, the gas purification apparatus S' is operated under a situation in which the valve 161, disposed between the first branch conduit 146 of the third delivery conduit 136 and the second delivery conduit 34, and the valve 171, disposed in the fifth branch conduit 151 of the exhaust delivery conduit 140, are opened, with the valve 162, disposed between the second branch conduit 156 of the third delivery conduit 136 and the second branch conduit 34, and the valve 172, disposed in the sixth branch conduit 152 of the exhaust delivery conduit 140 being closed, respectively. With such a situation, upon elapse of a predetermined time from startup of operation of the gas purification apparatus S', the operation is switched over to cause the valves 161 and 171 to be closed while causing the valves 162 and 172 to be opened. Subsequently, the first branch conduit 146 and the third branch conduit 148 are disconnected to be separated from the gas purification apparatus S', remained in its continuous operation, and put in the outside the system. Then, adherents present on an inner surface of the cylindrical wall of the first branch conduit 146 are mechanically peeled off for removal and the filter 44 of the third branch conduit 148 is replaced by another one. Upon elapse of another predetermined time, further, the operation is switched in sequence to cause the valves 161 and 171 to be opened while causing the valves 162 and 172 to be closed with the gas purification apparatus S' remained unchanged in its continuous operation. Then, the second branch conduit 156 and the fourth branch conduit 158 are disconnected and put in the outside of the system. Subsequently, adherents present on an inner surface of the cylindrical wall of the second branch conduit 156 are mechanically peeled off for removal and the filter 44 of the fourth branch conduit 158 is replaced by another one.

Furthermore, it becomes also possible to cause the heaters 147 and 157, correspondingly disposed to the first branch conduit 146 and the second branch conduit 156 of the third delivery conduit 136, to heat the cylindrical walls of the first branch conduit 146 and the second branch conduit 156 at temperatures equal to or above the melting point of the molten salt 12 for thereby melting adherents on the respective inner surfaces for removal. It can be said that such a situation is more preferable in structure because of no need arising for the first branch conduit 146 and the second branch conduit 156 to be disconnected for open when removing adherents from the cylindrical walls of the first branch conduit 146 and the second branch conduit 156. Also, in such a situation, the heaters 39, associated with the filters 44 disposed in the third branch conduit 148 and the fourth branch conduit 158 of the fourth delivery conduit 138, respectively, may heat and melt relevant adherents at temperatures equal to or above the melting point of the molten salt 12 for removal, or these adherents may be mechanically peeled off.

EXPERIMENTAL EXAMPLES

Several experimental examples, conducted on the gas purification apparatus S of the embodiment shown in FIG. 1 for highly purifying gas, are described below further with reference to FIGS. 3 and 4.

FIG. 3 is a table showing test conditions (abbreviated as TEST COND in FIG. 3) and test results (abbreviated as TEST RESULT in FIG. 3) in case that gas was highly purified using the gas purification apparatus of the present embodiment. FIG. 4 is a graph showing test results in case that gas was highly purified using the gas purification apparatus of the present embodiment.

As summarized in a table of FIG. 3, first, test conditions used in the present experimental examples include a condition A to a condition F (abbreviated as COND A to COND F in FIG. 3). The experimental examples were conducted on such respective test conditions using molten zinc chloride as the molten salt 12 with the electrode body 14 applied with a predetermined electric current to execute electrolyses for ten hours as each test time (abbreviated as TEST TIME in FIG. 3). Zinc, formed as electrolytic product metal, was stored in the molten salt storage vessel 10 while permitting chlorine gas, formed as electrolytic product gas, to be exhausted upward through the exhaust tower 30. In such experimental examples, evaluations were made by measuring a weight of zinc chloride, collected by the filter 44, to check how much zinc chloride is spattered to flow into the exhaust delivery conduit 40 disposed on a downstream stage of the porous body 42.

For the test conditions, more particularly, a crucible, made of carbon and having an inner diameter of 340 mm with a height of 780 mm, was used as the molten salt storage vessel 10, in which a temperature of zinc chloride (abbreviated as $ZnCl_2$ TEMP in FIG. 3) was maintained at a value ranging from 575° C. to 585° C. to store molten zinc chloride as the molten salt 12. The cover 20 was made of stainless steel alloy with an inner diameter 404 mm and a height of 285 mm. Further, the electrode body 14 was comprised of a sum of four carbon electrodes involving the plate electrodes 14a and 14b and the intermediate plate electrodes 14c and 14d with the conductive wires 16a and 16b including electrode bars made of steel alloy, respectively. The amount of resulting chlorine gas generated in the form of electrolytic product gas per unit time (abbreviated as $Cl_2$ AMT in FIG. 3) was 10 l/min.

Further, inner diameters of the first delivery conduit 32, the second delivery conduit 34, the third delivery conduit 36 and the fourth delivery conduit 38 of the exhaust tower 30 (abbreviated as INNER DIA in FIG. 3) were 108 mm while tube lengths of the first delivery conduit 32 and the third delivery conduit 36 were 142 mm, respectively, and a tube length of the second delivery conduit 34 was 700 mm with a tube length of the fourth delivery conduit 38 being 250 mm. A gas flow rate of chlorine gas, passing through the first delivery conduit 32, the second delivery conduit 34, the third delivery conduit 36, the fourth delivery conduit 38 and the exhaust tower 40 (abbreviated as FLOW RATE in FIG. 3) was 3.76 cm/sec.

Here, a weight of zinc chloride spattered and flowing into the porous body 42 per unit time (abbreviated as INFLUENT $ZnCl_2$ WT in FIG. 3) is calculated as a value of 3.9 g/min.

Furthermore, the second delivery conduit 34 had a cylindrical wall with a surface thereof maintained at a temperature of 380° C. and was internally provided with the porous body 42 a material of which is carbon or alumina (abbreviated as MATL in FIG. 3). Chlorine gas, prevailing in the first delivery conduit 32 in the area immediately ahead of the porous body 42 on the upstream thereof, was maintained at a temperature (primary side temperature: abbreviated as PRI GAS TEMP in FIG. 3) ranging from 340° C. to 360° C., and chlorine gas, prevailing in the third delivery conduit 36 in an area immediately behind the porous body 42 on the downstream stage thereof, was maintained at a temperature (secondary side temperature: abbreviated as SEC GAS TEMP in FIG. 3) ranging from 180° C. to 220° C. Examples of such a porous body 42 included porous bodies, made of carbon, for the condition A to the condition C, and porous bodies, made of alumina, for the condition D to the condition F. Concerning the porous bodies 42, thicknesses (along a length of the second delivery conduit 34 in a tube length thereof: abbreviated as THICKNESS in FIG. 3), porosities (abbreviated as POROSITY in FIG. 3), specific surface areas (abbreviated as SP SUR A. in FIG. 3) and surface areas (total surface areas: abbreviated as TOT SUR A. in FIG. 3), used for the condition A to the condition F, respectively, are indicated in the table of FIG. 3, which also indicates a surface area (total surface area) of each porous body 42 per unit weight of zinc chloride spattered and flowing into the porous body 42 per unit time (abbreviated as TOT SUR A./INFLUENT $ZnCl_2$ WT in FIGS. 3 and 4).

Moreover, the fourth delivery conduit 38 had a cylindrical wall with a surface thereof maintained at a temperature of 110° C. and was internally provided with the filter 44 comprised of a bag filter, made of PTFE and glass cloth, which had an air permeability set to $3\pm1$ $cm^3/(cm^2/sec)$ with a collecting efficiency set to 99.4% for particles having particle diameters ranging from 0.1 μm to 0.5 μm.

Figure 4:
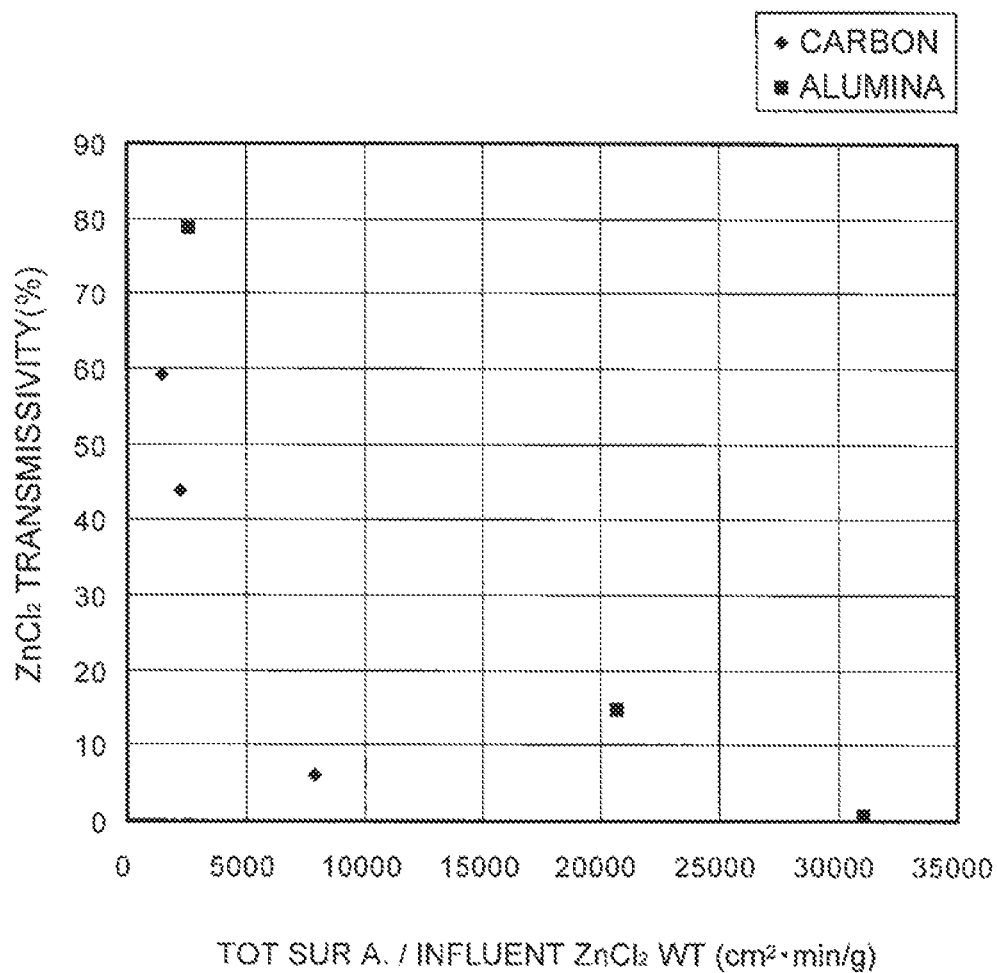
FIG. 4 is a graph showing test results in case that gas was highly purified using the gas purification apparatus of the present embodiment.

Test results, obtained under the various test conditions set forth above, are indicated in the table at a lower area thereof in FIG. 3 and plotted in the graph of FIG. 4, respectively. From these, it will be understood that in any of the materials including carbon and alumina used for the porous body 42, the greater the surface area (total surface area) of the porous body 42 per unit weight of zinc chloride spattered and flowing into the porous body 42 per unit time, the less will be the weight of zinc chloride collected by the filter 44 (abbreviated as COLLECTED $ZnCl_2$ WT in FIG. 3) after an elapse of ten hours in test time with a transmissivity of the porous body 42 for zinc chloride (abbreviated as $ZnCl_2$ TRANSMISSIVITY in FIGS. 3 and 4) being reduced. Also, in any of these test conditions, a gas pressure drop (abbreviated as G PRESS. D in FIG. 3), generated when chlorine gas as electrolytic product gas passed through the porous body 42, was small enough.

In any of these test conditions, substantially, no clogging occurred in the filter 44. In any of these test conditions, moreover, about 10 liters of chlorine gas, permeated through the filter 44, was collected and aerated into pure water, and a zinc concentration in its resulting solution was analyzed using an emission spectrophotometer (ICP-AES). Each analyzed zinc concentration was less than a detection limit (0.2 ppm) of zinc by use of the emission spectrophotometer, with chlorine gas, permeated through the filter 44, being highly purified to the extent in which no zinc chloride constituent was substantially contained therein. This is thought to be derived from the fact that for any of the test conditions, various conditions were properly settled including the temperature in the area immediately ahead of the porous body 42, the temperature of the porous body 42 per se, the temperature of the filter 44 per se, the flow rate of chlorine gas passing through the first delivery conduit 32, the second delivery conduit 34, the third delivery conduit 36, the fourth delivery conduit 38 and the exhaust delivery conduit 40, and the like.

Under the condition C, the condition E and the condition F in which the surface area (total surface area) of the porous body 42 per unit weight of zinc chloride spattered and flowing into the porous body 42 per unit time was set to a value of 5000 $cm^2 \cdot min/g$ or more, further, each weight of zinc chloride, collected by the filter 44 after an elapse of 10 hours in test time, marked a remarkable reduction. Under the condition F, in particular, it was revealed that 99.5% by weight of zinc chloride, supposed to be spattered when no porous body 42 was provided, was not spattered into the filter 44. From this, it can be understood that an operational lifetime of the filter 44 can be dramatically increased.

Further, the porous body, made of carbon, was used as the porous body 42 each for the condition A to the condition C and the porous body, made of alumina, was used each for the condition D to the condition F. When the surface area of the porous body 42 per unit weight of zinc chloride, flowing into the porous body 42 per unit time, was taken as an index, the porous body 42, made of carbon, marked a result of higher performance than that of the other. When the porous body 42 was made of carbon, in contrast, due to a decrease in the relevant specific surface area thereof, its cubic volume tends to increase for a required surface area to be ensured. That is, in practice, the greater will be the specific surface area of the material to be used, the smaller will be the cubic volume required for the porous body 42. Therefore, the material for the porous body 42 may be suitably determined in further consideration of whether it is available to get the material having increased specific surface area with an appropriate cubic volume at low cost.

Comparative Examples for Condition A to Condition F

Meanwhile, comparative examples were conducted using structures with no provision of the porous bodies 42 under the various test conditions set forth above.

As shown in the condition G indicated in FIG. 3, it was turned out that the weight of zinc chloride, collected by the filter 44 after an elapse of 10 hours in test time, had a remarkable increase. With the weight of zinc chloride marked such a level, the filter 44 will be clogged up for an interval of several tens of hours and, in actual practice, the operational lifetime of the filter 44 is evaluated to be short.

Experimental Example Differing in Gas Flow Rate

Further, another experimental example was conducted with chlorine gas in the form of electrolytic product gas flowing through the first delivery conduit 32, the second delivery conduit 34, the third delivery conduit 36, the fourth delivery conduit 38 and the exhaust delivery conduit 40 at a gas flow rate that was set to a small value. More particularly, as shown in the condition H of FIG. 3, electrolysis was conducted for 450 hours in test time at a gas flow rate of 0.08 cm/sec with the other remaining test conditions being set to be identical to those of the condition F.

The condition H was set up such that a part of zinc chloride, collected by the filter 44, was spontaneously peeled off for return to the alumina porous body 42 and a result was obtained in which 94.7% by weight of zinc chloride, supposed to be spattered in the absence of the porous body 42, was not spattered into the filter 44. This can be evaluated that the operation could be performed while causing zinc chloride to be returned to the porous body 42 at a recirculation rate ranging from 15% to 30%.

Comparative Example for Condition H

Meanwhile, another comparative example was conducted under the condition H with a structure in which a disposed position of the filter 44 was displaced from a top portion immediately above the porous body 42 such that no salt is returned to the porous body. As indicated in the condition I of FIG. 3, a weight ratio of zinc chloride, removed by the porous body 42, marked a value of 77.6% changed from 94.7% resulting under the condition H.

It can be understood from the results of the experimental example with the difference in gas flow rate and the result of its corresponding comparative example that the gas flow rate of zinc chloride can be lowered to fall in a practical range to allow zinc chloride to be returned to the porous body 42 for thereby enabling the filter 44 to have a further extended lifetime.

In the structure, set forth above, there are provided the reflux mechanism liquefying the salt, contained in the gas, for return to the molten salt in the vessel, and the filtration mechanism disposed in the exhaust flow path of the gas on the downstream stage of the reflux mechanism. With such a structure, comprising; refluxing the salt, contained in the gas, in the exhaust flow path of the gas containing the salt, through liquefying the salt for return to the molten salt in the vessel; and filtering the salt, contained in the gas, as a downstream step of refluxing the salt, further, when gas is extracted from the vessel storing the molten salt held at a temperature equal to or above a melting point thereof in a molten state, a major portion of the salt accompanied with the gas in a state of vapor, mist and fine particles can be caused to return as molten liquid to the molten salt stored in the vessel, during which the gas can be filtered at the downstream stage for thereby remarkably increasing a lifetime of the filter to minimize operational man-hours required for maintenance while achieving a remarkable reduction of the salt in exhaust gas for thereby highly purifying the gas.

Incidentally, the present invention is not limited to the embodiment described above in terms of kinds, layouts and the number of component members or the like and it is of course to be noted that various modifications may be suitably made without departing from the scope of the invention including replacement of the component elements by those having equivalent advantageous effects.

Industrial Applicability

As set forth above, the present invention is able to provide a gas purification apparatus and method in which, when gas is extracted from a vessel storing molten salt held at a temperature equal to or above a melting point thereof in a molten state, a major portion of salt accompanied with gas in a state of vapor, mist and fine particles is caused to return as molten liquid to molten salt stored in the vessel during which gas is caused to pass across a filter disposed in a downstream stage for thereby remarkably increasing a lifetime of the filter to minimize operational man-hours required for maintenance while achieving a remarkable reduction of salt in exhaust gas for thereby highly purifying gas. Thus, the present invention can be expected to have wide applications to a molten salt electrolysis apparatus in generous-purpose and universal nature.

The invention claimed is:

1. A gas purification apparatus for highly purifying a gas containing a salt derived from a molten salt stored in a vessel, comprising:
   a reflux mechanism for liquefying the salt, contained in the gas, for return to the molten salt in the vessel; and
   a filtration mechanism disposed in an exhaust flow path of the gas on a downstream stage of the reflux mechanism,
   wherein the reflux mechanism comprises a porous body disposed in the exhaust flow path of the gas communicated with the vessel, and a heater operative to set the porous body at a temperature equal to or above a melting point of the salt contained in the gas so as to melt the salt.

2. The gas purification apparatus according to claim 1, wherein the porous body has a surface area set to a value of 5000 cm²·min/g or more per unit weight of the salt flowing into the porous body per unit time.

3. The gas purification apparatus according to claim 2, wherein a gas flow rate of the gas, containing the salt and flowing into the porous body, is set to a value ranging from 0.1 cm/sec to 100 cm/sec.

4. The gas purification apparatus according to claim 2, wherein the salt, contained in the gas passing through the porous body, is returned to the porous body.

5. The gas purification apparatus according to claim 1, wherein the porous body has a main component including at least one kind of alumina, carbon, silica, silicon nitride, silicon carbide and boron nitride.

6. The gas purification apparatus according to claim 1, wherein the porous body includes at least one kind of a porous structured product, a fibrous structured product and a filler product filled with a filler material.

7. The gas purification apparatus according to claim 1, wherein a temperature of an area immediately ahead of the porous body into which the gas, containing the salt, flows is set to a value equal to or above the melting point of the salt.

8. The gas purification apparatus according to claim 7, wherein the temperature of the area immediately ahead of the porous body into which the gas, containing the salt, flows is set to a value higher than the melting point of the salt by 200° C. or less.

9. The gas purification apparatus according to claim 1, wherein the vessel includes a cover member disposed above the molten salt stored in the vessel to define an internal space whose upper temperature is set to a value less than a melting point of the salt.

10. The gas purification apparatus according to claim 1, wherein the filtration mechanism includes a filter filtering the salt contained in the gas, and a heater set to keep the heater at a temperature of 100° C. or more.

11. The gas purification apparatus according to claim 10, wherein the temperature of the filter is set to a value less than a melting point of the salt.

12. The gas purification apparatus according to claim 10, wherein an air permeability of the filter is set to a value ranging from 1.0 cm³/(cm²/sec) to 5.0 cm³/(cm²/sec).

13. The gas purification apparatus according to claim 10, wherein the filter includes at least one kind of a felt material, a woven fabric material and a porous material formed using at least one of polytetrafluoroethylene, polypropylene, polyester and aramid, a glass cloth and a porous body having a main component of alumina silicate.

14. The gas purification apparatus according to claim 1, wherein the exhaust flow path of the gas on a downstream stage of the reflux mechanism includes branch conduits.

15. The gas purification apparatus according to claim 14, wherein temperatures of walls of the branch conduits are set to values equal to or higher than the melting point of the salt.

16. The gas purification apparatus according to claim 1, wherein the gas is obtained by executing electrolysis of the molten salt stored in the vessel.

17. The gas purification apparatus according to claim 1, wherein the molten salt includes zinc chloride.

18. A gas purification method highly purifying a gas containing a salt derived from a molten salt stored in a vessel, comprising:
    refluxing the salt, contained in the gas, in exhaust flow path of the gas, through liquefying the salt for return to the molten salt in the vessel with a reflux mechanism; and
    filtering the salt, contained in the gas, as a downstream step of refluxing the salt with a filtration mechanism disposed in an exhaust flow path of the gas on a downstream stage of the reflux mechanism,
    wherein the reflux mechanism comprises a porous body disposed in the exhaust flow path of the gas communicated with the vessel, and a heater operative to set the porous body at a temperature equal to or above a melting point of the salt contained in the gas so as to melt the salt.

* * * * *